Oct. 22, 1929.    A. C. LYLES    1,733,066
FEEDING DEVICE
Filed Feb. 4, 1928
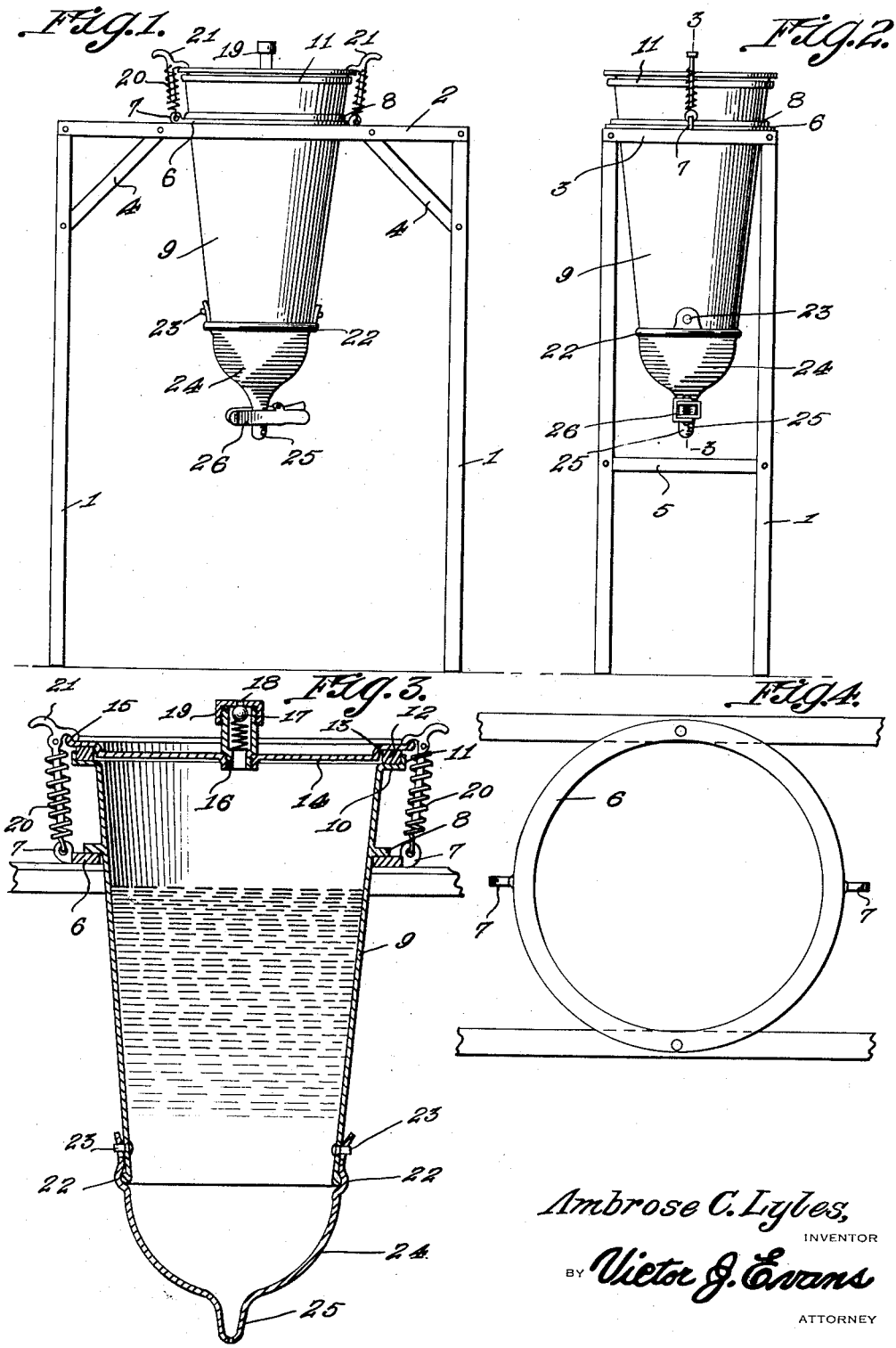
Ambrose C. Lyles,
INVENTOR
BY Victor J. Evans
ATTORNEY Patented Oct. 22, 1929

1,733,066

UNITED STATES PATENT OFFICE

AMBROSE CHARLEY LYLES, OF GREENSBORO, ALABAMA

FEEDING DEVICE

Application filed February 4, 1928. Serial No. 251,918.

My present invention has reference to a calf feeding device and my object is the provision of a device for this purpose in which a container for milk is mounted on the top of a frame in a removable but rigid manner, the said container having a compressible nipple at the bottom thereof through which the calf draws the milk from the container, and wherein provision is made for the admission of air into the container as the milk is drawn therefrom and likewise wherein the teat of the nipple may be sealed to prevent the calf using the milk except at determined intervals.

A further object is the provision of a calf feeder in which the container is effectively sealed to prevent the entrance of dust thereto and is mounted in a manner that will obviate the liability of upsetting thereof by the calf employing the same.

To the attainment of the above broadly stated objects and others which will present themselves as the nature of the invention is better understood, the improvement also resides in certain other novel features of construction, combination and operative association of parts, one satisfactory embodiment of which is disclosed by the accompanying drawings.

In the drawings:

Figure 1 is a side elevation of my improvement.

Figure 2 is an end view thereof.

Figure 3 is an enlarged sectional view approximately on the line 3—3 of Figure 2.

Figure 4 is a fragmentary top plan view of the frame to illustrate the ring support for the container.

As disclosed by the drawings I make use of a frame which is of a suitable height and which may be constructed of any desired material. The frame, of course, is strong and rigid and includes corner posts 1, connected at their upper ends by both longitudinal and transverse plates or beams 2 and 3, respectively. Between the longitudinal beams and the posts 1 there are brace elements 4 and between the sides of the posts there are transverse plates 5. The posts may be embedded in the ground but the structure is such that I have not found this necessary and as a matter-of-fact the frame is designed to be conveyed to convenient places for the feeding of calves.

Fixed on the frame at the center thereof, there is a flat metal ring member 6. This ring at the sides thereof disposed between the top elements of the frame, is formed with upwardly extending ears 7. The flat ring 6 is designed to receive thereon an annular flange 8 which projects from the periphery of the funnel-shaped body 9 of the milk container of the improvement. The body 9, at its open top is flanged outwardly, as at 10, and is formed with an upstanding peripheral flange 11. Between the flanges 10 and 11 there is seated a ring gasket 12. This gasket is designed to be engaged by the offset or lipped portion 13 on the under face at the periphery of the sealing cap 14 for the container 9. The sealing cap has its outer edge formed with a bead 15. The sealing cap is in the nature of a disc and has centrally screwed therein a short pipe 16 in which is seated a spring influenced, preferably ball valve 17 that closes an opening 18 in the flanged cap or cover 19 for the pipe 16.

Secured to the ears 7 there are the ends of coil springs 20. Entering these springs and secured to the outer convolutions thereof there are the shanks of hooks 21 and these hooks 21 are designed to be swung over the bead 15 of the closure 14 for effectively sustaining the same on the container.

The lower and reduced end of the flared or funnel-shaped container 9 is beaded, as at 22, and above the bead, the said container is provided with studs or like elements 23, the bead as well as the elements 23 are designed for engagement with the mouth portion of a rubber nipple 24. The teat of the nipple is indicated for distinction by the numeral 25 and when this teat is to be sealed the same is engaged by the jaws of a spring clamp 26 as disclosed by Figures 1 and 2 of the drawings.

A calf desiring feed will walk between the uprights 2 of the frame and will, of course, engage the teat 25 of the nipple 24, drawing the milk from the container. The valve 17 will be automatically opened by the suction created by the outflow of milk, but when this valve is seated the milk cannot flow through the nipple. Also by this arrangement the calf cannot suck air through the nipple and consequently is not in danger of contracting colic. The container is effectively sealed but the cap therefor may be easily and quickly removed for the insertion of fresh milk into the container. In this instance the clamp element 26 is, of course, brought to engage with the teat 25 of the nipple.

It is believed the simplicity of my invention and the advantages thereof will be perfectly apparent when the foregoing description has been carefully read in connection with the accompanying drawings, but obviously I do not wish to be restricted to the precise details of construction herein set forth and, therefore, hold myself entitled to such changes therefrom as fairly fall within the scope of what I claim.

Having described the invention, I claim:

The combination of a support including a ring, of a flared milk container designed to be inserted through the ring and having a nipple removably secured to its outer or lower end, and having an integral flange to contact with the ring of the support, said container having a lip flanged outwardly and upwardly to afford a receptacle for a gasket, a valve containing closure for the receptacle having an annular offset portion to contact with the gasket and having an outer beaded edge, and spring influenced hooks carried by the ring for engaging the beaded edge of the closure.

In testimony whereof I affix my signature.

AMBROSE C. LYLES.